Patented Jan. 15, 1946

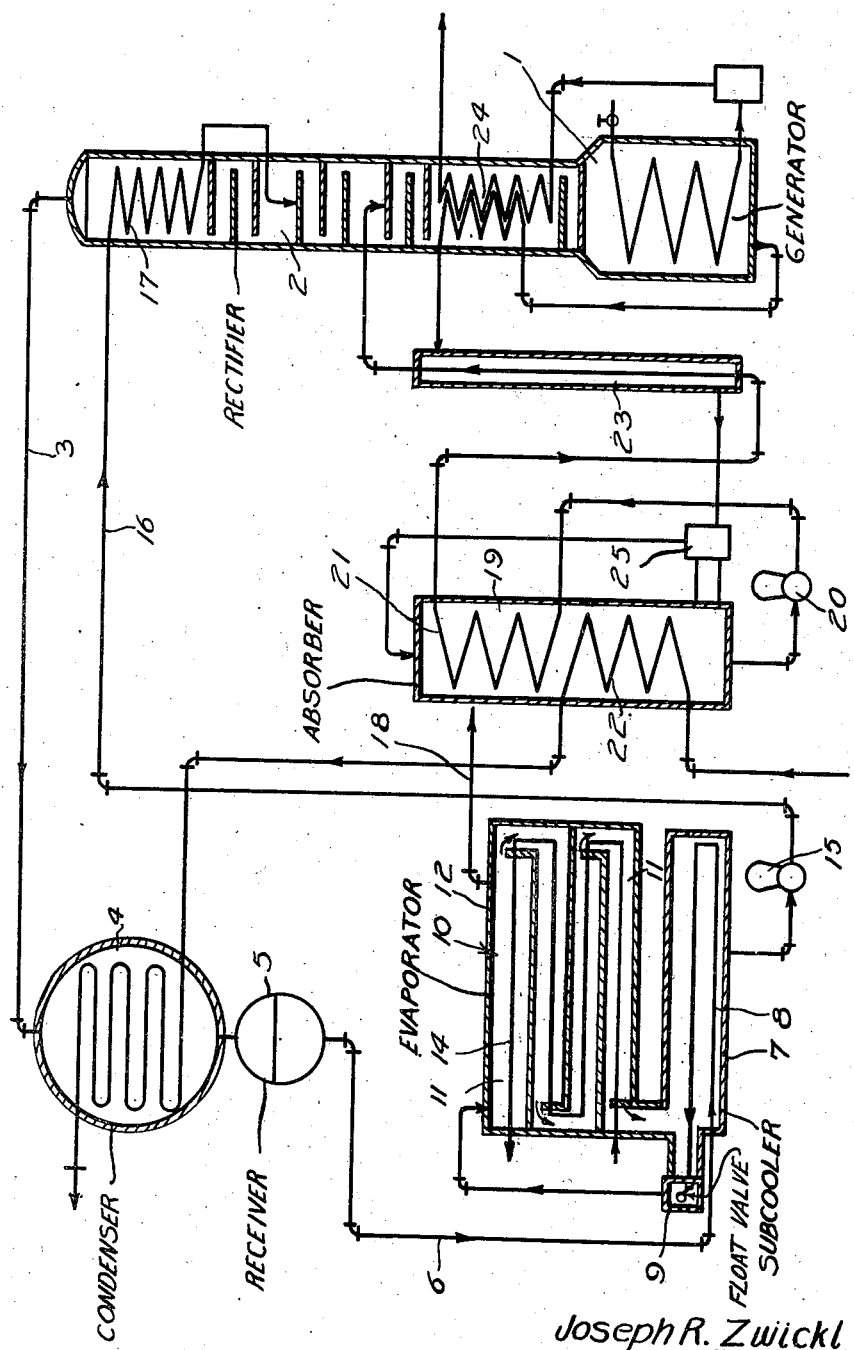

2,392,894

UNITED STATES PATENT OFFICE 2,392,894

REFRIGERATION SYSTEM

Joseph R. Zwickl, East Orange, N. J., assignor to Worthington Pump and Machinery Corporation, Harrison, N. J., a corporation of Delaware Application February 19, 1944, Serial No. 523,003

6 Claims. (Cl. 62—5)

This invention relates to refrigeration systems, and more particularly to an ammonia absorption refrigeration system which eliminates the collection or accumulation of water in the cooler or evaporator of such a system, by comparatively simple, inexpensive means, and also eliminates a need of apparatus for, either continuously or at spaced intervals, taking predetermined quantities of the contaminated ammonia out of the system for purification by distillation.

In the standard absorption systems of refrigeration, the ammonia vapor produced in the evaporator is absorbed by water (weak aqua) in the absorber under essentially the same pressure which exists in the evaporator. The ammonia, after being absorbed, is pumped along with the water (now strong aqua) into the generator where heat is applied to the strong aqua so as to again drive out the ammonia vapor which then passes to the condenser and from the condenser as liquid to the cooler or evaporator; whereas, the degassed solution is returned as weak aqua to the absorber for repeating the cycle. As the ammonia is driven or evaporated out of the strong aqua by heat in the generator, it always carries along a certain amount of water vapor, which amount depends upon the concentration of the strong aqua.

The presence of such water raises the boiling temperature of the ammonia in the cooler or evaporator and, therefore, has always been considered as a detrimental ballast. Once such water is in the cooler it can not get out but collects therein and if not removed soon seriously interferes with the operation of the cooler.

For the purpose of reducing the quantity of the undesirable water vapor, various methods have been resorted to over a period of years with a trend to employing rectifying towers similar to or substantially the same as those used in the chemical industry. The proper operation of such rectifying towers requires a substantial amount of reflux for the purpose of washing out the water vapor with ammonia; since every part of the reflux ammonia must be revaporized and condensed again, this procedure materially increases the cost of operation of the system, since the heat input to the generator and the cooling of the condenser must be increased accordingly. However, in spite of elaborate systems of this type, it is impossible to remove all of the water and to prevent some small amount of water from going over into the low side of the system, and having no way to escape it will accumulate in the cooler or evaporator, resulting in the disadvantage and trouble above referred to. Auxiliary equipment has been employed to take out of the cooler, either in continuous or spaced interval operation, a predetermined amount of the contaminated ammonia for purifying by distilling, but this also requires additional heat and cooling water.

From the standpoint of refrigeration action, it is not necessary to have pure ammonia, provided ways and means are employed to prevent accumulation of water (or water vapor) in the cooler or evaporator; and while the boiling point of the impure ammonia rises in proportion to the percentage of the water therein, the present invention provides a system embodying means to prevent the accumulation of water in the evaporator and also means to counteract or compensate for the slightly rising temperature of the impure refrigerant.

With these and other objects in view, as may occur from the accompanying specification, the invention consisting of various features of construction and combination of parts which will be first described in connection with the accompanying drawing showing diagrammatically an absorption refrigeration system of the preferred form embodying the invention, and the features forming the invention will be specifically pointed out in the claims.

Referring more particularly to the drawing, the ammonia vapor formed by the generator 1 rises through the rectifying column or rectifier 2 and passes from the top thereof through a suitable connection into the condenser 4. The generator 1 may be of any approved type of generator commonly employed in absorption refrigeration systems, and also the condenser 4 is of the conventional type employed in refrigeration systems. The ammonia vapor and any water vapor carried over with it to the condenser 4 are condensed therein and pass into the receiver 5. From the receiver 5 the liquid refrigerant passes through a suitable connection 6 to the refrigerant precooler (subcooler) 7. This precooler 7 comprises suitable tubing 8 which forms a closed passage through the precooler for the liquid refrigerant. The liquid refrigerant flows from the closed passage 8 through a control float valve 9 into the cooler or evaporator 10. The cooler or evaporator 10 comprises a plurality of troughs 11 disposed staggeredly in the shell 12 thereof, and the liquid refrigerant delivered to the top of the cooler spills over from the uppermost trough 11 into the one next therebelow and flows the full length of the lower trough, spilling over therefrom into the trough directly below it. Thus the liquid refrigerant flows in a sinuous path through the cooler or evaporator 10 and spills over from the lowermost trough 11 therein into the subcooler or refrigerant precooler 7 where it surrounds the closed passage 8 and co-operates in heat exchange relationship with the liquid refrigerant flowing through this passage 8 on its way to the cooler 10. The fluid brine to be cooled flows through the closed passageway 14, formed by suitable tubing which is submerged in the liquid refrigerant on the shelves 11. This passageway 14 carries the brine in a sinuous way but oppositely to the flow of the liquid refrigerant through the troughs 11, and thus a counter-current cooler is provided.

In the cooling process in the evaporator 10, ammonia is predominantly vaporized and the water is all left in the solution, thus in each next lower trough or shelf of the cooler 10 the ammonia concentration is less, and finally from the last or lowermost trough or shelf, the unvaporized refrigerant together with the water is passed to the subcooler or refrigerant precooler 7 where further of the ammonia is vaporized in the heat transfer action between the warm liquid refrigerant going through the closed passage 8 and the cold liquid in the subcooler surrounding said closed passage. That part of the refrigerant which is not vaporized in either the cooler 10 or the subcooler 7 is taken out by a residue pump 15 and delivered through a suitable connection 16 to the top of the rectifier 2. This impure residue liquid refrigerant passes through a heat exchanger 17 of any approved type which is located within the rectifier near the top thereof. In this heat exchanger 17, the sensible cold of the liquid refrigerant is used for producing reflux condensate for sealing off the top of the column in the rectifier. In this way the liquid residue is heated and is then entered into the rectifier column at a level which corresponds to its concentration, which, of course, is a point below the heat exchanger 17. By the use of the counter-current type of evaporator 10 combined with the liquid subcooler 7, the accumulation of water beyond a certain limit is definitely prevented. The quantity accumulation of water in the cooler and subcooler may be fixed by the rate at which the residue refrigerant is removed from the subcooler 7 by the residue pump 15. The float valve 9 which may be of any approved type that may be purchased upon the open market is connected to the subcooler 7 so that it will reguglate the flow of the liquid refrigerant from the receiver 5 into the cooler 10 in such a way that a definite level of the residue refrigerant is maintained in the subcooler 7. Thus the feed of the liquid refrigerant to the cooler is automatically adjusted in accordance with the rate of withdrawal of the residue from the subcooler so as to maintain the proper quantity of liquid refrigerant in all of the troughs or shelves 11 of the cooler 10 to provide the proper submergence of the closed tubing or passageway 14 for the brine to be cooled.

The vapor produced in the subcooler 7 and in the cooler 10 passes from the top of the cooler 10, to which it rises, through a suitable connection 18 into the absorber 19 where it is picked up by the weak aqua, thus converting the weak aqua into strong aqua by the absorption of the ammonia. The strong aqua is removed from the bottom of the absorber 19 by an aqua pump 20 and is delivered through a heat exchange apparatus 21 in the absorber to the rectifier 2 where it is degassed or vaporized by the heat applied to the generator.

When ammonia is absorbed, a substantial amount of heat is liberated. This must be removed, and also the aqua itself must be cooled below the temperature at which it enters the absorber so as to increase its absorbing capacity. The strong aqua which collects in the bottom of the absorber 19 has a low temperature as fixed by the temperature of the cooling water which circulates through the cooling coil 22 in the absorber. The sensible cold of the cooled strong aqua is utilized for removing some of the heat liberated in the absorber by means of the heat exchange coil 21 thus cutting down the amount of cooling water needed for proper operation of the absorber. During the passage of the strong aqua from the heat exchange apparatus 21, it passes through a second heat exchange apparatus 23 where it passes in heat exchange relationship with the weak aqua coming from the generator so that its temperature is raised still higher by the weak aqua and, finally, the strong aqua is fed into the rectifier 2 at the proper point corresponding to its temperature and concentration.

The weak aqua which collects at the bottom of the generator 1 has a comparatively high temperature, therefore its sensible heat can be utilized for preheating the strong aqua as it descends through the rectifier into the generator. For this purpose, the weak aqua is carried through a heat exchange arrangement indicated at 24 which is located at a suitable point in the rectifier so that the strong aqua will pass over its surface on its way to the generator 1. After the weak aqua passes through the heat exchange apparatus 24, it passes to the external heat exchanger 23 from where it goes to the top of the absorber 19 through a float valve structure 25. The float valve structure 25 may be of any approved type and is connected to the absorber and arranged so as to maintain a fixed, predetermined level of the strong aqua in the absorber.

In order to clear up more the working of the counter-flow evaporator 10 and refrigerant subcooler 7 when using an impure refrigerant, we shall analyze an illustrative case for which we assume that the ammonia vapor coming from the rectifier 2 has only a purity of 98% which was considered by far too low even with the older types of absorption machines. Therefore, no difficulty should be met in maintaining such low purity with even a rudimental rectifying equipment above the generator. We assume further a pressure of 220 lbs. absolute in the condenser 4, and 25 lbs. absolute in the (cooler or) evaporator 10. It may be further assumed that of every 10 lbs. of liquid refrigerant fed into the evaporator, 1 lb. is removed as unvaporized residue by the residue pump 15 and dumped back into the rectifier 2 as reflux. Again, this amount of reflux is rather small compared to the refluxes used in present day approved types of absorption machines. With these assumptions, the following conditions are found in the evaporator 10 and liquid subcooler 7: The temperature after the float valve 9 will be —7.4° F. out of every 10 lbs. of liquid refrigerant, 6.96 lbs. of ammonia are vaporized in the cooler 10; the rest passes into the liquid subcooler 7. During this vaporization, the purity of the refrigerant decreases from the assumed or final 98% to 92.6%; correspondingly, the temperature rises from —7.4° F. to —5.4° F. which 2° temperature rise is negligible since the flow of ammonia and brine is in counter-current.

and therefore this small temperature rise can be counterbalanced by a corresponding increase of the cooling surface. In the liquid subcooler 7, an additional 2.04 lbs. of ammonia are vaporized leaving 1 lb. of the refrigerant as residue. The purity of the refrigerant passing through the subcooler 7 changes from the above 92.6% to 80%, and its temperature rises from −5.4° F. to +1.7° F. This is quite a substantial change in temperature. However, since the liquid refrigerant coming down from the condenser is warm, it can be cooled with this contaminated refrigerant; thus it is possible to utilize all the refrigeration available and transform same into high grade refrigeration capacity because, if the 98% pure refrigerant was flashed without subcooling, a substantial amount of the ammonia would vaporize during the flashing leaving an already badly contaminated liquid with a substantially increased temperature for cooling the brine (to be cooled) which passes through the closed passage in the cooler 10. However, by first subcooling the liquid, as above described, the flashing across the float valve or flash valve 9 is reduced to a minimum and only a small amount of ammonia is vaporized, leaving most of it in the refrigerant, thus resulting in a lower temperature of the refrigerant after flashing than could be provided without subcooling. In case of pure ammonia, the importance of subcooling the liquid refrigerant is considerably less than in the instance just above described, since with pure ammonia, the temperature of the refrigerant after flashing is fixed only by the pressure in the evaporator, but is independent from the degree of subcooling before flashing.

The heat removed from the liquid refrigerant during its subcooling in 7 drives out from the leftover refrigerant all the ammonia down to a concentration which is fixed by the rate at which the unvaporized residue is removed from the subcooler 7. At the assumed ratio, 10:1, the purity of the residue liquid will be 80% provided the feed purity is 98%.

By the above described combination of counterflow (cooler or) evaporator 10 and the liquid refrigerant subcooler 7, a rather highly impure ammonia may be utilized without causing any trouble whatsoever in the cooler 10. The slight rise in temperature through the cooler 10 can be compensated by a corresponding increase in the cooling surface, and, if it is desired to maintain the same temperature as would be provided with pure ammonia at the same assumed 25 lbs. absolute pressure in the cooler 10, this can be accomplished by the slight drop in the pressure. For the assumed 98% feed purity, only 7.5% more surface is needed and only a 0.38 lb. pressure drop to have the same temperature conditions as would be provided with pure ammonia.

The purity of the residue for 98% feed purity is 80% in the liquid form, and the vapor coming off from this composition is approximately 99.9%; therefore, when this residue is used as reflux on top of the rectifier, no trouble will be experienced in maintaining the assumed 98% feed purity without elaborate rectifying apparatus. From the above, it is also clear that the concentration of the residue depends upon the rate at which this residue is removed from the subcooler 7. If the rate of removal is increased, the purity of the residue rises rapidly, and therefore a higher quality and greater quantity of reflux is delivered to the top of the rectifier 2. This will result in a higher quality gas passing to the condenser 4.

Thus by changing the delivery of the reflux pump 15, comparatively simple and easy means is provided to regulate the reflux ratio so as to give the most desirable working conditions.

The regulation of the capacity of the machine is very simple and may be provided by changing the delivery of the aqua pump 20 since the float valve 25 connected to the bottom of the absorber 19 will at all times endeavor to maintain a constant liquid level and thus regulate the flow through the system at the same rate as the aqua pump 20 is taking the aqua out of the absorber 19. The delivery of the aqua pump 20 can be influenced by a thermostat of any approved type located in the outlet of the closed passage 14 for the liquid to be cooled and which passes through the cooler 10.

It will be understood that the invention is not to be limited to the specific construction or arrangement of parts shown, but that they may be widely modified within the invention defined by the claims.

What is claimed is:

1. In an absorption refrigeration system utilizing a refrigerant to cool a fluid to be cooled, a generator, a rectifier, an absorber, a condenser, and an evaporator through which the fluid to be cooled flows in a closed passage, a subcooler having a closed passage therethrough, means connecting the subcooler closed passage to said condenser for receiving condensed refrigerant from the condenser, means connecting said subcooler closed passage to said evaporator for delivering the refrigerant from the subcooler closed passage into said evaporator, and a connection between said evaporator and subcooler for permitting the non-evaporated refrigerant to flow from the evaporator into the subcooler about the exterior of the subcooler closed passage, said rectifier having a vapor outlet connected to said condenser, and means for delivering the refrigerant which flows into the subcooler exteriorly of the subcooler closed passage into said rectifier at a predetermined point inwardly of said vapor outlet.

2. In an absorption refrigeration system utilizing a refrigerant to cool a fluid to be cooled, a generator, a rectifier, an absorber, a condenser, and an evaporator through which the fluid to be cooled flows in a closed passage, a subcooler having a closed passage therethrough means connecting the subcooler closed passage to said condenser for receiving condensed refrigerant from the condenser, means connecting said subcooler closed passage to said evaporator for delivering the refrigerant from the subcooler closed passage into said evaporator, and a connection between said evaporator and subcooler for permitting the non-evaporated refrigerant to flow from the cooler into the subcooler about the exterior of the subcooler closed passage, said rectifier having a vapor outlet connected to said condenser, and means for delivering the refrigerant which flows into the subcooler exteriorly of the subcooler closed passage into said rectifier at a predetermined point inwardly of said vapor outlet, a heat exchanger in said rectifier through which said refrigerant flows prior to its delivery into the rectifier.

3. In an absorption refrigeration system utilizing a refrigerant to cool a fluid to be cooled, a generator, a rectifier, an absorber, a condenser, and an evaporator through which the fluid to be cooled flows in a closed passage, a subcooler having a closed passage therethrough, means connecting the subcooler closed passage to said condenser for receiving condensed refrigerant from the condenser, means connecting said subcooler closed passage to said evaporator for delivering the refrigerant from the subcooler closed passage into said evaporator, said evaporator embodying means for causing a flow of the refrigerant therethrough in multiple passes counter-current to the flow of the fluid to be cooled through the cooler, and a float valve operated by variances in the level of non-evaporated refrigerant in the sub-cooler for controlling the flow of refrigerant from the sub-cooler closed passage into the evaporator.

4. In an absorption refrigeration system utilizing a refrigerant to cool a fluid to be cooled, a generator, a rectifier, an absorber, a condenser, and an evaporator through which the fluid to be cooled flows in a closed passage, a subcooler having a closed passage therethrough, means connecting the subcooler closed passage to said condenser for receiving condensed refrigerant from the condenser, means connecting said subcooler closed passage to said evaporator for delivering the refrigerant from the subcooler closed passage into said evaporator, said evaporator embodying means for causing a flow of the refrigerant therethrough in multiple passes counter-current to the flow of the fluid to be cooled through the cooler, a connection between said evaporator and subcooler for permitting the non-evaporated refrigerant to flow from the evaporator into the subcooler about the exterior of said subcooler closed passage, and a float valve operated by variances in the level of non-evaporated refrigerant in the subcooler for controlling the flow of refrigerant from the subcooler closed passage into the evaporator.

5. In an absorption refrigeration system utilizing a refrigerant to cool a fluid to be cooled, a generator, a rectifier, an absorber, a condenser, and an evaporator through which the fluid to be cooled flows in a closed passage, a subcooler having a closed passage therethrough, means connecting the subcooler closed passage to said condenser for receiving condensed refrigerant from the condenser, means connecting said subcooler closed passage to said evaporator for delivering the refrigerant from the subcooler closed passage into said evaporator, said evaporator embodying means for causing a flow of the refrigerant therethrough in multiple passes counter-current to the flow of the fluid to be cooled through the evaporator, and a connection between said evaporator and subcooler for permitting the non-evaporated refrigerant to flow from the evaporator into the subcooler about the exterior of said subcooler closed passage, said rectifier having a vapor outlet connected to said condenser, and means for delivering the refrigerant which flows into the subcooler exteriorly of the subcooler closed passage into said rectifier at a predetermied point inwardly of said vapor outlet.

6. In an absorption refrigeration system utilizing a refrigerant to cool a fluid to be cooled, a generator, a rectifier, an absorber, a condenser, and an evaporator through which the fluid to be cooled flows in a closed passage, a subcooler having a closed passage therethrough, means connecting the subcooler closed passage to said condenser for receiving condensed refrigerant from the condenser, means connecting said subcooler closed passage to said evaporator for delivering the refrigerant from the subcooler closed passage into said evaporator, said evaporator embodying means for causing a flow of the refrigerant therethrough in multiple passes counter-current to the flow of the fluid to be cooled through the cooler, and a connection between said evaporator and subcooler for permitting the non-evaporated refrigerant to flow from the evaporator into the subcooler about the exterior of said subcooler closed passage, said rectifier having a vapor outlet connected to said condenser, and means for delivering the refrigerant which flows into the subcooler exteriorly of the subcooler closed passage into said rectifier at a predetermined point inwardly of said vapor outlet, a heat exchanger in said rectifier through which said refrigerant flows prior to its delivery into the rectifier.

JOSEPH R. ZWICKL.